(No Model.)
C. A. PRENTISS.
GAS CHAMBER IN SODA WATER APPARATUS.
No. 288,487. Patented Nov. 13, 1883.
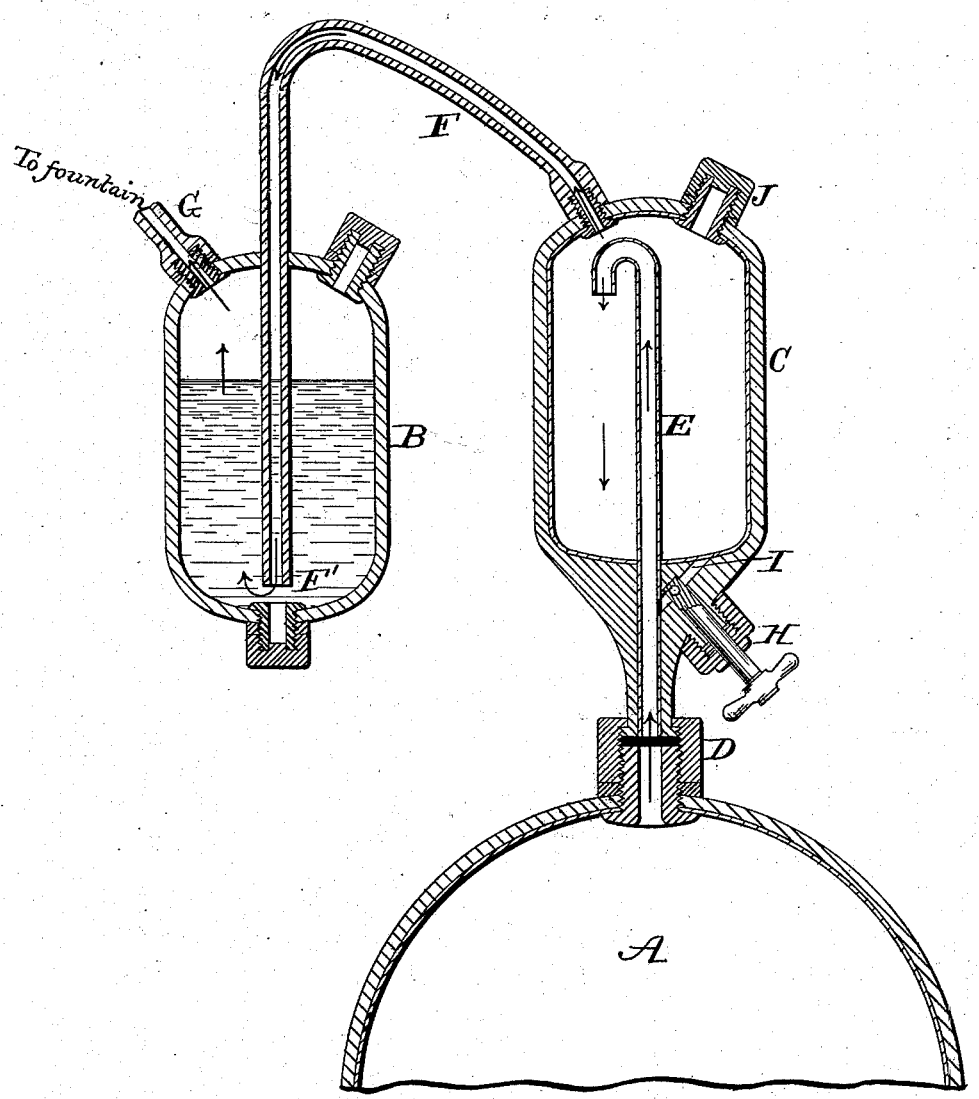
Witnesses:
Frank C. Henry
W. H. Alburger
Inventor:
Charles A. Prentiss

UNITED STATES PATENT OFFICE.

CHARLES A. PRENTISS, OF WASHINGTON, DISTRICT OF COLUMBIA.

GAS-CHAMBER IN SODA-WATER APPARATUS.

SPECIFICATION forming part of Letters Patent No. 288,487, dated November 13, 1883.

Application filed May 11, 1883. (No model.)

*To all whom it may concern:*

Be it known that I, CHARLES A. PRENTISS, a citizen of the United States, residing at the city of Washington, in the District of Columbia, have invented a new and useful Improvement in Soda-Water Apparatus, of which the following is a specification.

My invention relates to soda-water apparatus; and my said invention consists of a chamber through which the gas passes, and in which the impurities in said gas are precipitated and retained, said chamber having an inlet-pipe which discharges the gas into the chamber at or near the top thereof, and an outlet-pipe, also at the top, by which the gas escapes from said chamber.

The object of my invention is to free the gas before being used of the impurities usually contained therein—such as sulphuric acid, marble-dust, gypsum, &c., which are frequently found in the gas in such quantities as to render it injurious and unfit for use. The necessity for freeing the gas from these impurities has long been felt, and attempts have been made to accomplish the object with but partial success. The ordinary gas purifier or washer is the result of these attempts; but even with this addition it has frequently been found that the gas would contain large quantities of impurities.

The foregoing objections and defects in the manufacture of soda-water have been fully overcome by my proposed invention, and the impurities contained in the gas are eliminated therefrom before said gas enters the discharge-pipe, as will hereinafter more fully appear.

In the drawing accompanying this application and forming a part of the same, a sectional elevation of a generator and purifier of ordinary construction and my proposed sediment-chamber employed in connection therewith are illustrated, the several parts of the apparatus being arranged in the preferred form.

A is the generator, and B the purifier, of the ordinary or any preferred form.

C is the sediment-chamber, which in this instance is arranged to be connected directly to the generator by means of any suitable coupling at one end, as at D.

E is the gas-inlet pipe, which conducts the gas to the sediment-chamber. This pipe, as shown, terminates at the top portion of the chamber, and by reason of a downwardly-directed end delivers the gas directly into said chamber and directs the flow thereof toward the bottom. The object of this is to cause a precipitation of the impurities, while the gas, which is so much lighter, will soon overcome the downward impetus given to it in passing through the inlet-pipe and rise upward and pass through the outlet-pipe F, and enter the purifier B. As is usual, this purifying-chamber B is partially filled with water for washing and cooling the gas, and the inlet-pipe thereto is made to terminate at the extreme bottom thereof, as shown at F', in order that the gas may get the full benefit of the entire body of water.

As here shown, the pipe E passes up through the bottom of the sediment-chamber; but this is not essential, as the said pipe may enter the chamber at any convenient point, so that its top or discharge end will terminate at the top portion of the chamber. The exact point of the termination of said pipe is also immaterial; but it is preferably at least four inches from the top and directed downward.

The operation is as follows: The gas, as formed in the generator A, and carrying with it the foam and other impurities, enters the sediment-chamber C through pipe E, and freely escapes therein at the top thereof. The impurities, being heavier than the gas, settle at the bottom, while the lighter gas passes off at the top through the pipe F, and enters the purifier B at the bottom thereof, where it is washed, and thence conducted through the discharge-pipe G to the fountain or retort.

It is immaterial whether the sediment or auxiliary chamber C is arranged as shown in the drawing, so as to receive the gas directly from the generating-chamber, or so as to receive it from the purifier after passing therethrough, and if found that the sediment-chamber will accomplish the desired result in connection alone with the generator it may be so employed; or, on the other hand, two of these auxiliary chambers may be employed—one adjacent the generator to receive the gas therefrom, and one adjacent the purifier to receive the gas after passing therethrough. Further, one or more of these chambers may be employed, and also one or more purifiers may be used, as found to accomplish the desired results.

At the bottom of the chamber C a cock, H, is arranged in a lateral opening, I, by which the sediment, &c., collected in said chamber may be discharged either back into the generator, as here shown, or directly from the bottom of said chamber. J is a hand-hole to assist in the operation of cleansing the chamber. The details of construction of this chamber C may be varied without departing from my invention, the gist of which consists in the auxiliary chamber C, the gas-inlet pipe of which terminates at or near the top thereof, for the purposes specified.

I claim—

1. A sediment-chamber for soda-water apparatus, provided with an inlet-pipe extending into said chamber and terminating near its top, whereby the gas finds its exit near the top of the chamber and the precipitation and retention of impurities are insured, substantially as set forth.

2. The combination, in a soda-water apparatus, with the generating-chamber, in which the gas is formed, of a sediment-chamber provided with an inlet-pipe extending into said chamber and terminating near its top, whereby the gas from the generator finds its exit near the top of the sediment-chamber and the precipitation and retention of impurities are insured, substantially as set forth.

3. A sediment-chamber for soda-water apparatus, provided with an inlet-pipe extending into said chamber and terminating near its top, whereby the gas finds its exit near the top of the chamber and the precipitation and retention of impurities are insured, an outlet-pipe which enters the chamber at its top, and a suitable discharge at the bottom for the impurities, substantially as set forth.

4. The combination, in a soda-water apparatus, with the generating-chamber, in which the gas is formed, and the purifying-chamber, in which the gas is washed, of a sediment-chamber provided with an inlet-pipe extending into said chamber and terminating near its top, whereby the gas finds its exit near the top of the chamber, and the precipitation and retention of impurities are insured either before or after the washing of the gas, substantially as set forth.

5. The combination, in a soda-water apparatus, of the sediment-chamber C, provided with the inlet-pipe E, terminating near the top of the chamber, and having a downwardly-directed delivery end, outlet-pipe F, hand-hole J, and discharge-cock H, substantially as and for the purposes set forth.

In testimony whereof I affix my signature in presence of two witnesses.

CHARLES A. PRENTISS.

Witnesses:
H. J. ENGLAND,
F. M. GREEN.